Patented Sept. 1, 1953

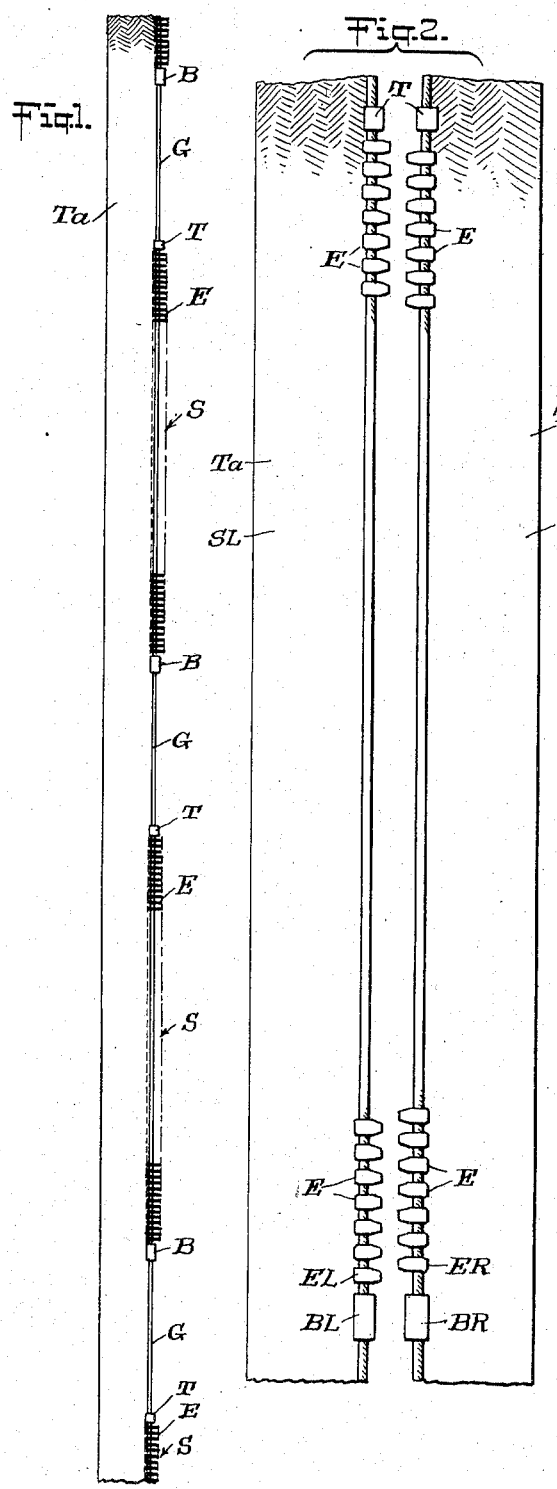

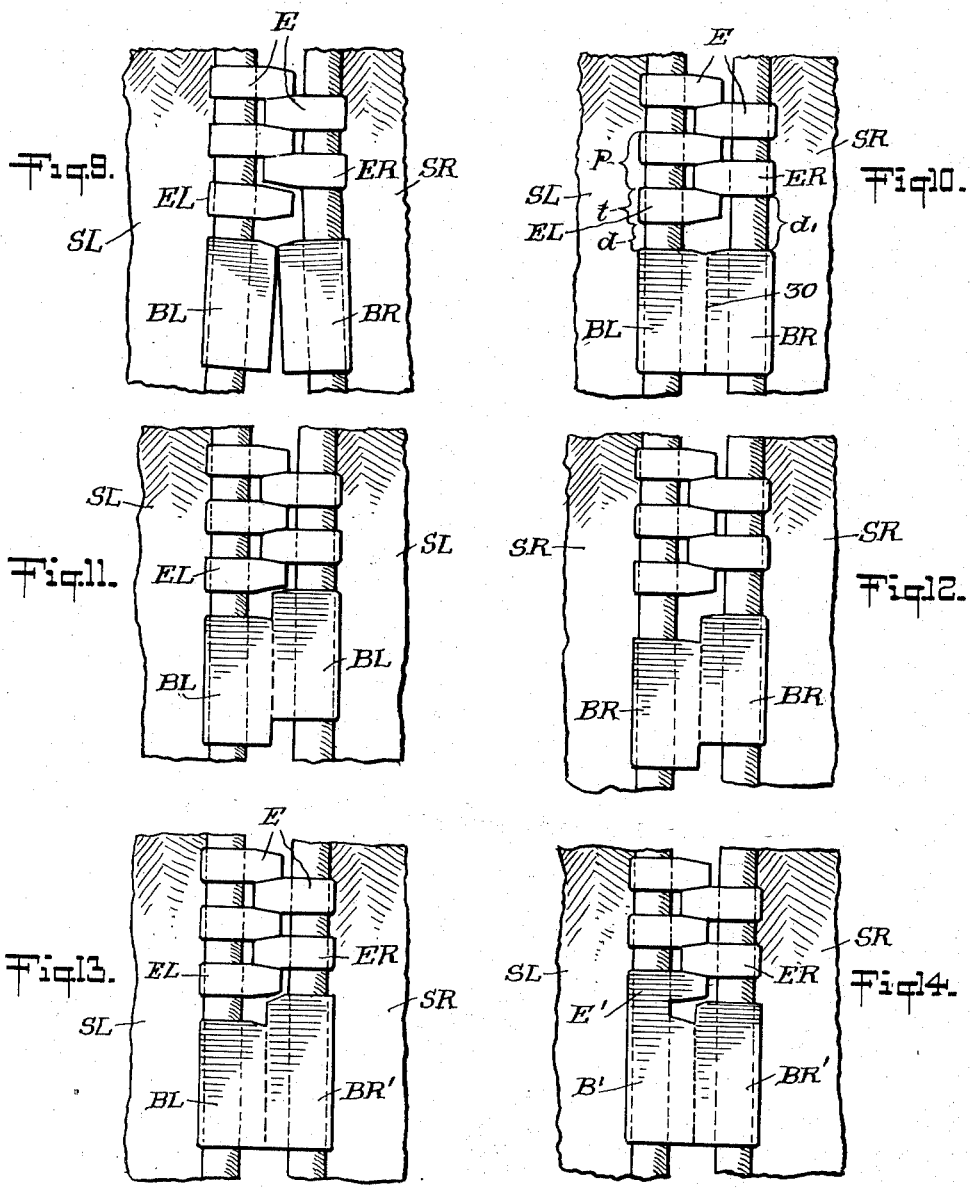

2,650,402

UNITED STATES PATENT OFFICE 2,650,402

PLASTIC SLIDE FASTENER

Joseph N. Kuzmick, Clifton, N. J., assignor to Conmar Products Corporation, Newark, N. J., a corporation of New Jersey Continuation of application Serial No. 510,575, November 17, 1943. This application August 25, 1947, Serial No. 770,471

6 Claims. (Cl. 24—205.11)

This invention relates to an improved method of manufacturing plastic slide fasteners, and more particularly to an improved method of making such fasteners by molding the slide fastener elements directly onto the tapes to form the stringers. This application is a continuation of my copending application Serial No. 510,575, filed November 17, 1943.

In prior methods of making plastic slide fasteners of the type in which the fastener elements are molded directly onto a tape, the top and bottom stops are made separately and are cemented onto the tape after the slide fastener elements are molded thereon. In completing the construction of a slide fastener, two stringers (with or without cemented-on top stops, depending on the method followed) are assembled with a slider and are interlocked by the slider, after which the bottom stop is cemented to the two stringers, thus uniting the stringers at their bottoms and forming the bottom stop for the slider. This method is characterized by obvious disadvantages. The steps of separately making the top and bottom stops and of handling the same, the separate steps of molding the slide fastener elements and then applying and cementing the stops to the tape and the step of cementing-on of the bottom stops after the stringer pairs and sliders are assembled, involve an undesirable multiplying of manufacturing and assembling operations. Furthermore, the cementing of the stops onto the tape is delicate work requiring extra time; and cemented-on stops, because of their insecure grip, are a frequent source of fault and failure.

The prime object of my present invention centers about the provision of a method of manufacturing molded-on plastic slide fasteners and the products of such manufacture, in which the top and bottom stops may be molded onto the tape and may be molded in the operation of molding the slide fastener elements onto the tape; the method and structure being, moreover, such that the stringers may thereafter be assembled with the slider to form the complete slide fasteners, without the need, incident to prior methods, of then applying or attaching any of the stops to the tapes. Thereby, the steps of separately making and handling the stops, the step of separately applying or cementing the stops to the tape, and cementing of the stops to the tape in assembled slide fasteners are entirely obviated, thus considerably reducing in number difficult manufacturing and assembling steps, and molded-on stops, with their superior gripping properties, are produced.

To the accomplishment of this object and these purposes and such other objects as may hereinafter appear, my invention relates to the method of manufacturing slide fasteners and the intermediate and end products thereof as sought to be defined in the appended claims and as described in the following specification taken together with the drawings, in which:

Fig. 1 is a view of a slide fastener stringer chain made in accordance with the method of the present invention;

Fig. 2 is a view of a pair of stringers made pursuant to this method, positioned for mating or interlocking relation to form a slide fastener;

Fig. 3 is an elevational view of a form of top stop used;

Fig. 4 is a plan view thereof;

Fig. 5 is an elevational view of a form of bottom stop portion used;

Fig. 6 is a view illustrating the manner of assembling the stringer pair of Fig. 2 with a slider;

Fig. 7 is a plan view illustrating the disposition of the bottom stop portions of the stringer pair of Fig. 6 after the assembling operation of Fig. 6;

Fig. 8 is a view of Fig. 7 illustrating the manner of uniting the bottom stop portions to complete the slide fastener assembly;

Fig. 9 is an elevational view illustrating the bottoms of the stringer pair (of Fig. 6) after the slider assembling operation;

Fig. 10 is a view similar to Fig. 9 and showing the construction after the bottom stop portions have been united to form a completed bottom stop;

Fig. 11 is a view corresponding to Fig. 10, but showing the assembling of two so-called left stringers of the type shown in Fig. 10;

Fig. 12 is a view also corresponding to Fig. 10, but showing the assembling of two so-called right stringers of the type shown in Fig. 10;

Fig. 13 is a view corresponding to Fig. 10, but showing a modified structure of the bottom stop portions; and Fig. 14 is a view of a still further modification again corresponding to Fig. 10, but showing a modified form of bottom stop portions.

The essence of the method of manufacturing slide fasteners of the present invention consists in molding directly onto a tape, a group of spaced slide fastener elements, a top stop at one end of the group, and a portion of a bottom stop at the other end of the group, thereby producing by molding a slide fastener stringer completed by top and bottom stop elements, then connecting a pair of said stringers into interlocked relation by means of a slider, and then uniting the two bottom stop portions into a completed bottom stop.

Fig. 1 of the drawings illustrates a stringer chain obtained in the molding step of the method; and Fig. 2 shows enlarged, a single pair of stringers cut from two such chains ready for assembly to form a completed slide fastener. The stringer chain comprises the spaced stringers S separated by the gaps G, each stringer consisting of a group of slide fastener elements E, a top stop T and a bottom stop portion B, the top stops T, T, the groups of slide fastener elements E, E, and the bottom stop portions B, B, being all molded directly onto the tape Ta.

The molding of the slide fastener elements and the stops may preferably be done by known injection methods. In making the stringer chain, the parts may be molded separately or in small or large groups; thus the top stop, the slide fastener elements and the bottom stop portion may be injection molded step by step, or a top stop, a group of slide fastener elements and a bottom stop portion may be molded in one shot. It will be understood that any desired shape or structure of bottom stop or top stop or slide fastener element may be used, and that these parts have been shown merely diagrammatically in the drawings except for the structural principles herein discussed.

Figs. 6 to 8 of the drawings illustrate the assembly of a stringer pair and completing the making of a slide fastener following the molding step of the method. A pair of stringers SL and SR, one a so-called left stringer and the other a so-called right stringer, such as more completely shown in Fig. 2 of the drawings, are assembled with and interlocked by a conventional type of slider 20 after the manner shown in Fig. 6. The pulling up of the slider 20 in the direction indicated by the arrow 22, or conversely, the pulling down of the stringers SL and SR in the direction indicated by the arrows 24, causes the interlocking of the elements E, E, of the stringer pair and produces the assembled stringer pair and slider. The bottom stop portions (now designated BL and BR to differentiate the left and right stop portions) first are threaded through the slider 20, the bottom stop portions being dimensioned so as to permit this threading through operation. The result is a completed slide fastener assembly except for the fact that the bottom stop portions BL and BR are non-united, as is illustrated by Fig. 7 of the drawings. The opposed faces 26 and 28 of the bottom stop portions BL and BR are then united by means of any suitable cement, thus forming the completed or unitary bottom stop shown in Fig. 8 of the drawings, the united or cemented faces being there designated by the dotted line 30.

The uniting of the two bottom stop portions BL and BR and the stages corresponding to those depicted in Figs. 7 and 8 of the drawings are also illustrated in Figs. 9 and 10 of the drawings, Fig. 9 depicting the bottom portions of the assembled slide fastener before they are cemented together, while Fig. 10 illustrates the same after they are cemented together, producing the completed slide fastener.

Thus the method consists simply in molding directly onto tapes, the slide fastener elements, the top stops and the bottom stop portions as illustrated in Fig. 1 of the drawings, thereby producing by molding slide fastener stringers such as is illustrated in Fig. 2 of the drawings, then simply connecting a pair of said stringers into interlocked relation by means of a slider as shown in Fig. 6 of the drawings, and then uniting the two bottom stop portions into a completed bottom stop as illustrated in Figs. 8 or 10 of the drawings.

Thereby, slide fastener stringers of the plastic element type may have all the parts directly molded thereon and may be assembled requiring only the cementing together of their bottom stop portions. And thereby, as outlined above, the steps of separately making and handling the stops, the step of separately applying or cementing the stops to the tape, and the cementing of the stops to the tape in assembled slide fasteners are obviated, and thereby molded-on stops with their superior gripping properties are produced.

As already indicated, the stringers are made in the form of left stringers SL and right stringers SR. These stringers have the same top stops T which may embody a construction as shown in Figs. 3 and 4 having the body 32 and the tape encompassing jaws 34. The bottom stop portions BL and BR, similar in form in the embodiment shown in Figs. 1 to 10 may have a construction as shown in Fig. 5, having the body 36 and the tape encompassing jaws 38. Due to the staggered arrangement of the elements EE on a stringer pair SL, SR (see Fig. 2), the number of fastener elements on one of the stringers such as SL will exceed by one the number of elements on the other stringer. The lowermost left and right elements EL and ER should, therefore, have a spacing respectively from the bottom stop portions so as to prevent any accidental unlocking of the slide fastener should any two stringers such as two left stringers or two right ones be assembled into a slide fastener, but also to make the assembly of any two stringers possible.

This latter is illustrated in Figs. 9 to 12 of the drawinges, where, in Figs. 9 and 10, the left stringer is shown assembled with a right stringer, and where, in Fig. 11, two left stringers SL, SL are shown assembled, while in Fig. 12 two right stringers SR, SR are shown assembled. The spacing between elements is indicated in Fig. 10 as $d$, the thickness of an element as $t$, and the pitch between elements $(d+t)$ as P. The lowermost element EL is preferably spaced from the bottom stop portion BL by the distance between any two adjacent elements, namely, the distance $d$. The lowermost element ER (the right stringer) is spaced from the bottom stop portion BR by the distance indicated in Fig. 10 as $d'$, which, it will be found, is equal to one-half P (the pitch between two elements) plus $d$ (the distance or spacing between two elements).

With a construction of this nature, a left stringer SL is assemblable with a right stringer SR as shown in Figs. 9 and 10 of the drawings, two left stringers SL, SL are assemblable as shown in Fig. 11 of the drawings, and two right stringers are assemblable as shown in Fig. 12 of the drawings. In all of these arrangements any accidental unlocking of the fastener will be prevented or at least made difficult and each of these will permit the assembling of the stringers as clearly shown in Figs. 10 to 12 of the drawings, and the assembling of the same with the slider. The provision of the distance $d$ makes the assembly of two left stringers possible as shown in Fig. 11, and the provision of the distance d' makes the assembly of two right stringers possible as shown in Fig. 12.

Fig. 13 shows a left stringer SL and a right stringer SR in which different lengths of bottom stop portions are provided. The bottom stop portion BL on the left stringer is identical with that shown in Figs. 1 to 12 of the drawings, while the bottom stop portion BR' of the right stringer is made longer than the portion BL by one-half of the pitch P. In this constructional form, the bottom stop portion BR' is spaced from the lowermost element ER by the same distance as the portion BL is spaced from the lowermost element EL, namely, the distance d. It will be evident from a comparison between Figs. 13 and 11 of the drawings that two left stringers of the type shown in Fig. 13 and two right stringers of the type shown in Fig. 13 may be assembled together, the parts clearing in the same way as is depicted by Fig. 11.

In the Fig. 13 form of construction the distance between the bottom portions and the lowermost fastener elements of both stringers is shortened as much as possible, thus preventing an undesirable unlocking of the slide fastener at the bottom end, which unlocking might otherwise occur because of lack of support of the lowermost element of the fastener.

In Fig. 14 of the drawings I show a still further modification in which the advantages of Fig. 13 are carried out by the use, however, of a bottom stop portion on a left stringer which is molded integrally with the lowermost fastener element. In this form of the invention the left stringer SL is provided with a bottom stop portion B' which is molded integrally with the lowermost element E', while the right stringer SR is provided with a bottom stop portion BR' similar to that shown in Fig. 13 and similarly spaced from the lowermost fastener element ER.

The manner of practicing the method of the present invention, the making of the products thereof, and the advantages over prior art practice in the manufacture of plastic fasteners in which the elements are directly molded onto the tape will in the main be fully apparent from the above detailed description thereof.

The plastic fastener elements E (Fig. 1) are applied to the tape, and at the same time a plastic top stop T is molded on the tape, and half of a plastic bottom stop B is molded on the tape. One method of molding plastic elements on a tape molds all of the elements of a stringer at once, the die having element cavities for a length of six inches for six-inch fasteners, eight inches for eight-inch fasteners, etc. After the die is opened, the tape is moved far enough to provide a gap space G between stringers, as well as a new length of tape for the next stringer. This molding method is well adapted for the present invention because, in accordance with the present invention, each mold is then provided with additional cavities at each end to mold a top stop T, and half B of a bottom stop, all during a single molding operation. The top stops are dimensioned too large to pass through a slider.

After two such chains of stringers have been formed, they are cut into pairs of stringers. Each pair is passed through a slider, as shown in Fig. 6. The halves of the bottom stop are readily able to pass through the slider, as shown in Fig. 6, and the elements of the two stringers are interlocked by the action of the slider, as shown in Fig. 9. At this time the halves of the bottom stop are still separate, but cannot be left that way, for if pulled apart by even the slightest force, the fastener will open from the bottom.

It will be observed in Fig. 9 that the bottom stop halves are each a single block of plastic material extending longitudinally of the tape, and that they have abutting faces of substantial area extending generally longitudinally of the tape and adapted to be cemented directly together in face to face relation, as indicated in Fig. 10. By such a cementing operation a complete nonseparable bottom stop is formed, and the only operations needed to complete the slide fastener after the initial molding operation, are to pass the stringers through a slider, and to then cement the halves of the bottom stop together. As much as possible is accomplished in the molding operation, and very little work is needed thereafter.

It will be further apparent that changes may be made in the method and the resulting product without departing from the spirit of the invention defined in the following claims.

I claim:

1. For a slide fastener, a pair of stringers, each stringer comprising a tape, a group of spaced slide fastener elements, a top stop at one end of the group, and a portion of a bottom stop at the other end of the group, the bottom stop portion on one stringer being distant from the adjacent fastener element on that stringer by the approximate distance between any two adjacent elements, and the bottom stop portion on the other stringer being distant from the adjacent fastener element on that stringer by a distance substantially equalling one-half the pitch between two elements plus the distance between two elements, the said top stops, groups of fastener elements and bottom stop portions being molded onto their respective tapes.

2. A slide fastener unit comprising a stringer, said stringer consisting of a tape, a group of spaced slide fastener elements, a top stop at one end of the group, and a portion of a bottom stop at the other end of the group, the bottom stop portion being distant from the next adjacent fastener element on the stringer by a distance substantially equalling one-half of the pitch between two elements plus the distance between two elements, the said top stop, group of fastener elements and bottom stop portion being molded onto the tape.

3. A slide fastener comprising a pair of stringers, each stringer comprising a tape, a group of spaced slide fastener elements, a top stop at one end of the group, and a portion of a bottom stop at the other end of the group, the bottom stop portion on one stringer being distant from the adjacent fastener element on that stringer by the approximate distance between any two adjacent elements, and the bottom stop portion on the other stringer being distant from the adjacent fastener element on that stringer by a distance substantially equalling one-half of the pitch between two elements plus the distance between two elements, the said top stops, groups of fastener elements and bottom stop portions being molded onto their respective tapes, and the bottom stop portions of the two stringers being united into a completed single bottom stop.

4. For a slide fastener, a pair of stringers, each stringer comprising a tape, a group of spaced slide fastener elements, a top stop at one end of the group, and a portion of a bottom stop at the other end of the group, the bottom stop portion of one stringer being distant from the adjacent element on that stringer by the approximate distance between any two adjacent elements, and the bottom stop portion on the other stringer being longer than the bottom stop portion on the first stringer substantially by one-half of the pitch between two elements, and being distant from the adjacent element on its stringer by the approximate distance between two adjacent elements, the top stops, groups of elements and bottom stop portions being molded onto their respective tapes.

5. A slide fastener comprising a pair of stringers, each stringer comprising a tape, a group of spaced slide fastener elements, a top stop at one end of the group, and a portion of a bottom stop at the other end of the group, the bottom stop portion of one stringer being distant from the adjacent element on that stringer by the approximate distance between any two adjacent elements, the bottom stop portion on the other stringer being longer than the bottom stop portion on the first stringer substantially by one-half of the pitch between two elements, and being distant from the adjacent element on its stringer by the approximate distance between two adjacent elements, the top stops, groups of elements and bottom stop portions being molded onto their respective tapes, and the bottom stop portions of the two stringers being united into a completed single bottom stop.

6. For a slide fastener, a pair of stringers, each stringer comprising a tape, a group of spaced slide fastener elements, a top stop at one end of the group, and a portion of a bottom stop at the other end of the group, the bottom stop portion of one stringer being integral with the adjacent fastener element on that stringer, and the bottom stop portion on the other stringer being spaced from the adjacent element on its stringer, the top stops, groups of elements and bottom stop portions being molded onto their respective tapes.

JOSEPH N. KUZMICK.

References Cited in the file of this patent

UNITED STATES PATENTS

| Number | Name | Date |
|---|---|---|
| 2,184,265 | Winterhalter | Dec. 19, 1939 |
| 2,186,774 | Sundback | Jan. 9, 1940 |
| 2,219,165 | Nedal | Oct. 22, 1940 |